United States Patent
Yee et al.

(10) Patent No.: US 8,465,106 B2
(45) Date of Patent: Jun. 18, 2013

(54) VEHICLE WHEEL AND WHEEL COVER ASSEMBLY AND METHOD FOR PRODUCING SAME

(75) Inventors: Peter Yee, Sunnyvale, CA (US); Joseph Wolf, Canton, MI (US)

(73) Assignee: Hayes Lemmerz International, Inc., Northville, MI (US)

(*) Notice: Subject to any disclaimer, the term of this patent is extended or adjusted under 35 U.S.C. 154(b) by 569 days.

(21) Appl. No.: 12/279,783

(22) PCT Filed: Feb. 20, 2007

(86) PCT No.: PCT/US2007/004368
§ 371 (c)(1),
(2), (4) Date: Jun. 8, 2010

(87) PCT Pub. No.: WO2007/098157
PCT Pub. Date: Aug. 30, 2007

(65) Prior Publication Data
US 2010/0237685 A1 Sep. 23, 2010

Related U.S. Application Data

(60) Provisional application No. 60/775,088, filed on Feb. 20, 2006.

(51) Int. Cl.
*B60B 7/06* (2006.01)
(52) U.S. Cl.
USPC .............. 301/37.27; 301/37.11; 301/37.43; 156/79

(58) Field of Classification Search
USPC ........ 301/37.11, 37.101, 37.27, 37.42–37.43; 29/894.38, 894.381; 156/60, 79, 91–92
See application file for complete search history.

(56) References Cited

U.S. PATENT DOCUMENTS

| | | |
|---|---|---|
| 5,188,429 A | 2/1993 | Heck et al. |
| 5,340,418 A | 8/1994 | Wei |
| 5,360,261 A | 11/1994 | Archibald et al. |
| 5,421,642 A | 6/1995 | Archibald |
| 5,533,261 A | 7/1996 | Kemmerer |
| 5,564,792 A | 10/1996 | Archibald |
| 5,597,213 A | 1/1997 | Chase |
| 2004/0144475 A1* | 7/2004 | Woelfel et al. ............. 156/79 |
| 2005/0189812 A1* | 9/2005 | Hogan ...................... 301/37.11 |

\* cited by examiner

*Primary Examiner* — Jason Bellinger
(74) *Attorney, Agent, or Firm* — MacMillan, Sobanski & Todd, LLC

(57) ABSTRACT

A method for producing a vehicle wheel and wheel cover assembly comprising the steps of: (a) providing a wheel cover having an inner surface and an outer surface; (b) selectively applying at least one shot of a first adhesive material to a portion of the inner surface of the wheel cover to define a predetermined masked area; (c) providing a vehicle wheel having an outboard face; (d) positioning the wheel cover and the vehicle wheel relative to one another whereby at least one cavity is formed between the inner surface of the wheel cover, the outboard face of the vehicle wheel, and the masked area of the wheel cover defined by the first adhesive material; and (e) selectively applying a second adhesive material to the cavity to secure the wheel cover to the vehicle wheel.

20 Claims, 6 Drawing Sheets

VEHICLE WHEEL AND WHEEL COVER ASSEMBLY AND METHOD FOR PRODUCING SAME

BACKGROUND OF THE INVENTION

This invention relates in general to vehicle wheels and, in particular, to an improved vehicle wheel cover retention system and method for producing the same.

BACKGROUND OF THE INVENTION

This invention relates in general to vehicle wheels and, in particular, to an improved vehicle wheel cover retention system and method for producing the same.

Automotive wheels serve two main purposes: 1) support of the vehicle and tire; and 2) provide an aesthetically pleasing appearance. Current technology often involves tradeoffs between those two goals. Wheels are typically constructed of metal or metal alloys, although alternative materials, such as composites, are envisioned. The aesthetic appearance of such a wheel is limited by manufacturing methods to form a given styled surface. Additionally, such a wheel will often have excess material (and weight) added to form said styled surface. Wheel clads or cover are used to simulate a styled wheel surface while utilizing a structural wheel underneath to support any loads imparted on the wheel. The cover is typically made of a plastic or thin metal material that is more easily formable into pleasing aesthetic shapes. The cover is then attached to the wheel by mechanical means, whether fasteners, adhesives or locking features formed into the cladding or the wheel. The cover can also receive a special surface coating to enhance its appearance, such as a bright paint or chrome plating. It is also desirable that the cover is not easily discernible as separate from the wheel. It is desirable to eliminate evidence of cover being used such as mating lines, a hollow sound when tapped, yielding to moderate pressure, preventing the entry of foreign matter between the parts and visible wheel surfaces behind the clad. To this end, adhesive foam is often used to deaden the hollow sound when tapped, fill the space between the wheel and cover to prevent entry of foreign matter and support the cover when pressure is applied to the cover.

It can be very difficult to use adhesives to join the cover and the wheel in a high volume manufacturing environment because the adhesive requires sufficient time for a chemical reaction to occur and expand (in the case of foams), attain handling strength and subsequently full strength. A fast curing adhesive will allow faster throughput but also cures quickly in the mixing equipment and requires more maintenance. Conversely, a slow curing adhesive possesses a longer open time before clogging inside the dispensing equipment but requires more work-in-process inventory and related resources, such as, floor space, cure ovens, material handling equipment and tooling.

Furthermore, when using an expanding foam, the cover and wheel assembly can be encapsulated inside a masking mold to contain the expanding foam. However, there often exists a path internal to the cover and wheel assembly through which it is undesirable to allow foam to enter. It is not feasible to mask off certain areas when the cover and wheel are assembled.

SUMMARY OF THE INVENTION

This invention relates to a vehicle wheel cover retention system comprising a vehicle wheel cover and a vehicle wheel defining a cavity between an inner surface of the wheel cover and an outer surface of the vehicle wheel. The cavity has a first adhesive disposed and a second adhesive disposed therein. Only the first adhesive is operative to secure the wheel cover to the vehicle wheel. The second adhesive is a premolded second adhesive deposited on the inner surface of the wheel cover in a predetermined masking pattern.

A method for producing the vehicle wheel cover retention system of the present invention comprises the steps of: providing a vehicle wheel cover; selectively applying at least one shot of an adhesive material to a portion of the vehicle wheel cover to define a masked area; providing a vehicle wheel; positioning the wheel cover and the vehicle wheel relative to one another whereby at least one cavity is formed between the wheel cover, the vehicle wheel and the masked area of the wheel cover; and selectively applying an adhesive material to the cavity.

Other advantages of this invention will become apparent to those skilled in the art from the following detailed description of the invention, when read in light of the accompanying drawings.

DETAILED DESCRIPTION OF THE INVENTION

Figure 1:
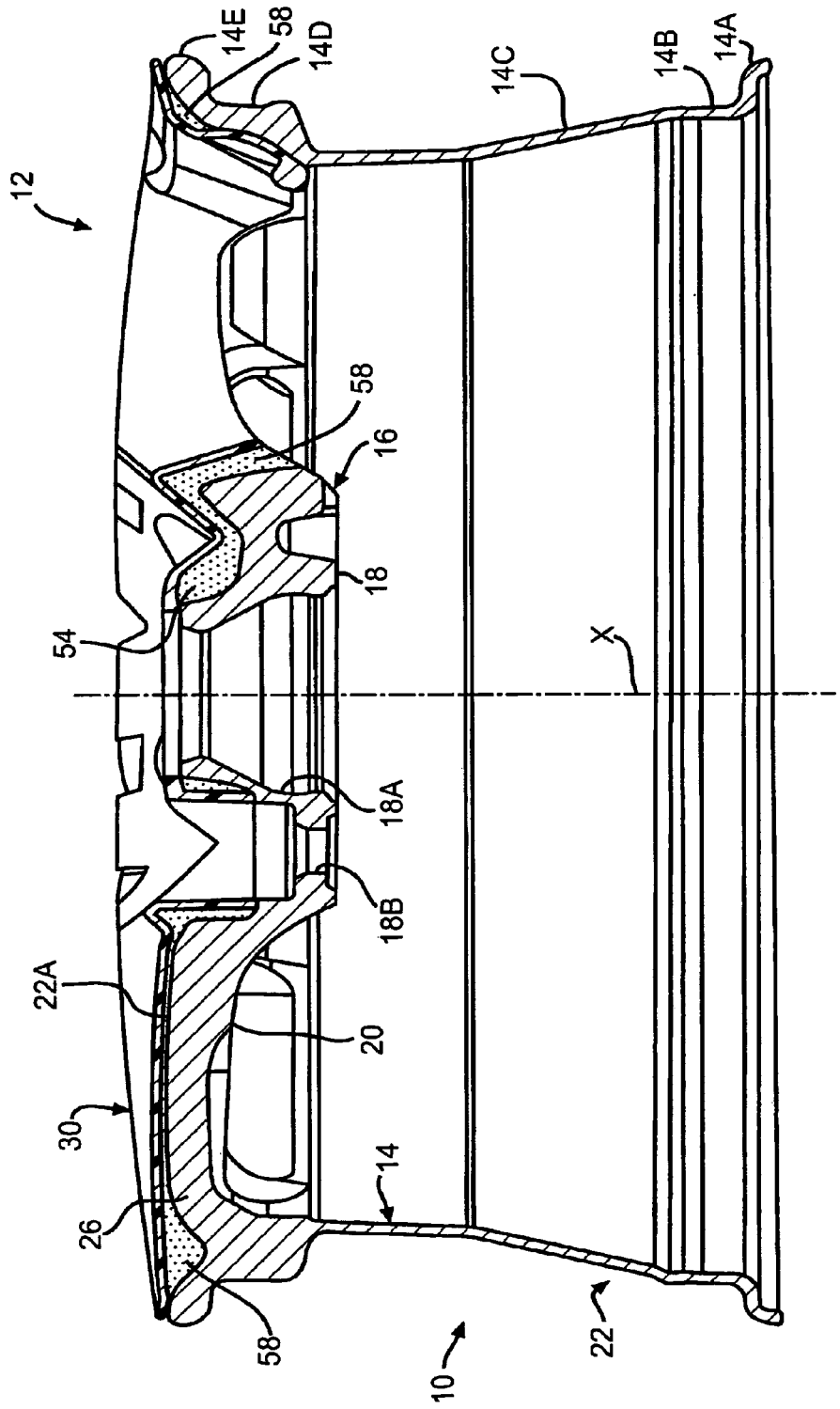
FIG. 1 is a view of a vehicle wheel cover adapted for use in accordance with the present invention to produce a vehicle wheel assembly
Figure 2:
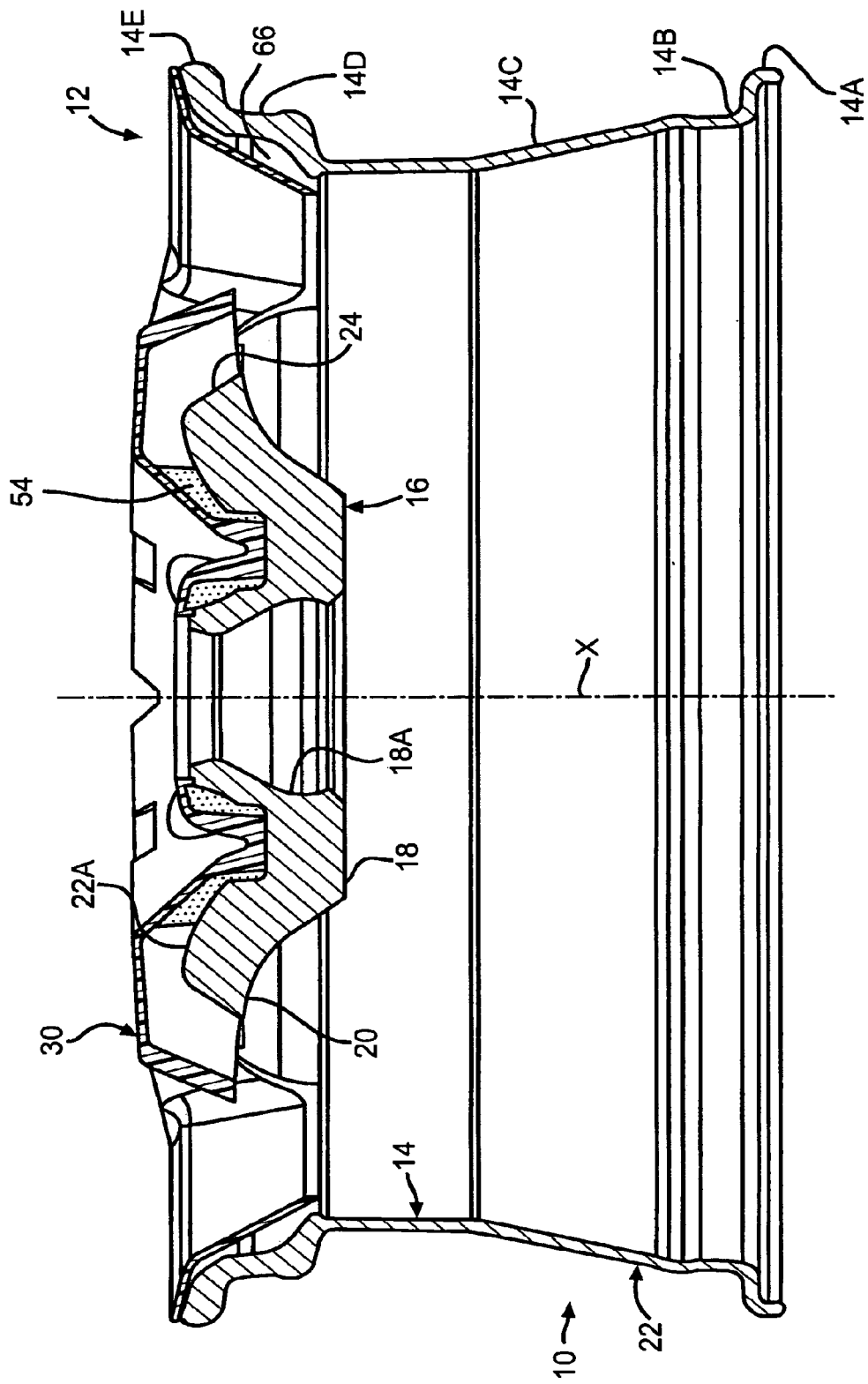
FIG. 2 is another view of the vehicle wheel cover illustrated in FIG. 1, the wheel cover shown after receiving a shot(s) of an adhesive/foam material.

This invention utilizes multiple shots of a material, i.e., an adhesive/foam material, dispensed prior to assembly and/or after assembling the cover and wheel. This will allow masking tools to effectively shut off areas of the cover and wheel prior to assembly that are not accessible otherwise. The preferred embodiment illustrated in FIGS. 1 to 6 is as follows: In a first step illustrated schematically in FIG. 5, place the wheel cover 10 shown in FIG. 1 face-down onto a lower masking tool (shown schematically in FIG. 5 by reference character LMT), this tool supports and locates the cover 10 and prevents foam from contacting an aesthetic surface. A tool (shown schematically in FIG. 5 by reference character PFT) for the first shot (pre-form tool) is located on the cover 10 and all three parts are clamped together as an assembly. The assembly is preferably allowed to reach a controlled temperature (either by external or internal, heating or cooling). The adhesive/foam material is selectively dispensed into the cavity between the pre-form tool and the cover 10 and allowed to react. After a desired period of time, the pre-form tool is unclamped and the cover 10 is moved having the material 12 selectively adhered thereon in a desired masking pattern, such as shown for example in FIG. 2. It is possible the cover 10 can receive more than one shot or dose of the same or different materials involving multiple pre-form tools depending on the desired masking effect which is to be achieved. The lower masking tool LMT from the pre-form step can also be used in this next step if desired. In the next step illustrated schematically in FIG. 6, the cover 10 would remain on the lower masking tool LMT and a wheel 14 is assembled face-down on top of the cover 10. The brake or back side of the wheel 14 is masked using an upper masking tool (schematically shown in FIG. 6 by reference character UMT). The four parts (lower masking tool LMT, cover 10, wheel 14 and upper masking tool UMT) are clamped together and preferably allowed to reach a controlled temperature. A suitable adhesive or foam material (not shown) is dispensed into the cavity between the cover 10 and the wheel 14 and allowed to react (some of such areas indicated by reference character 16 in FIGS. 3 and 4). During this step, areas that are not masked properly by the upper and lower mask tools are already sealed and filled by the pre-foam shot(s) of material 12 and thus simplify the upper and lower mask tools by eliminating areas of negative draft and removing core-outs and their respective actuators. Preferably, during this step, all the cavity areas between the cover and wheel are filled with the material; however, if desired, only some of the areas can be filled if so desired. After a desired period of time, the upper mask is unclamped and removed and the wheel assembly is removed and packaged for shipment. During storage and shipment the adhesive(s) is (are) allowed to cure and attain full strength and excess inventory is reduced. Preferably, the adhesive material that fills the cavity permanently secures the wheel cover 10 to the wheel 14. Alternatively, other means, such as mechanical retention means, i.e., snap tabs, fasteners or the like, can be used to assist in positioning the wheel cover relative to the wheel and/or for permanently securing the wheel cover to the wheel if so desired.

Other variations on this concept are envisioned depending on specific features of the parts being mated. The various shots of material can be of the same or differing products. Each shot can be and masking tools can be heated and/or cooled as necessary at any time during the process. The timing between shots can be varied depending on the desired performance of the assembly such as seam lines, cohesive bond strength, appearance and manufacturing considerations. Finally, this concept can be applied to any part or product that is joined by an adhesive material (whether expanding foam or other product) and is not easily masked as an assembly.

The present invention can be used with any suitable type of vehicle wheel cover formed from any suitable type of material. The wheel cover can be a one-piece wheel cover or can be a multiple piece wheel cover formed from the same or different material.

Figure 3:
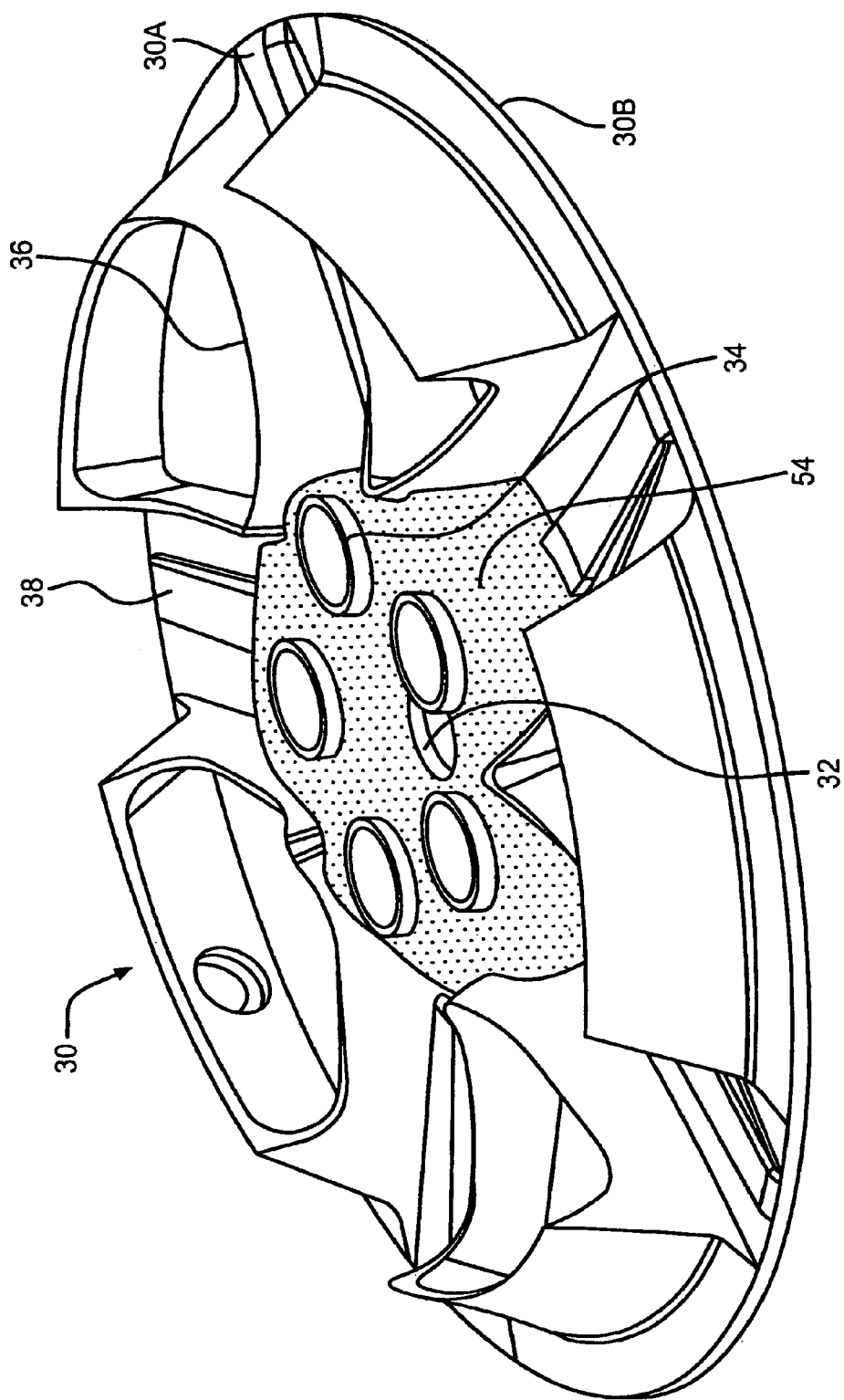
FIG. 3 is a sectional view of a vehicle wheel having the wheel cover shown in FIG. 2 assembled thereon, in accordance with the present invention.
Figure 4:
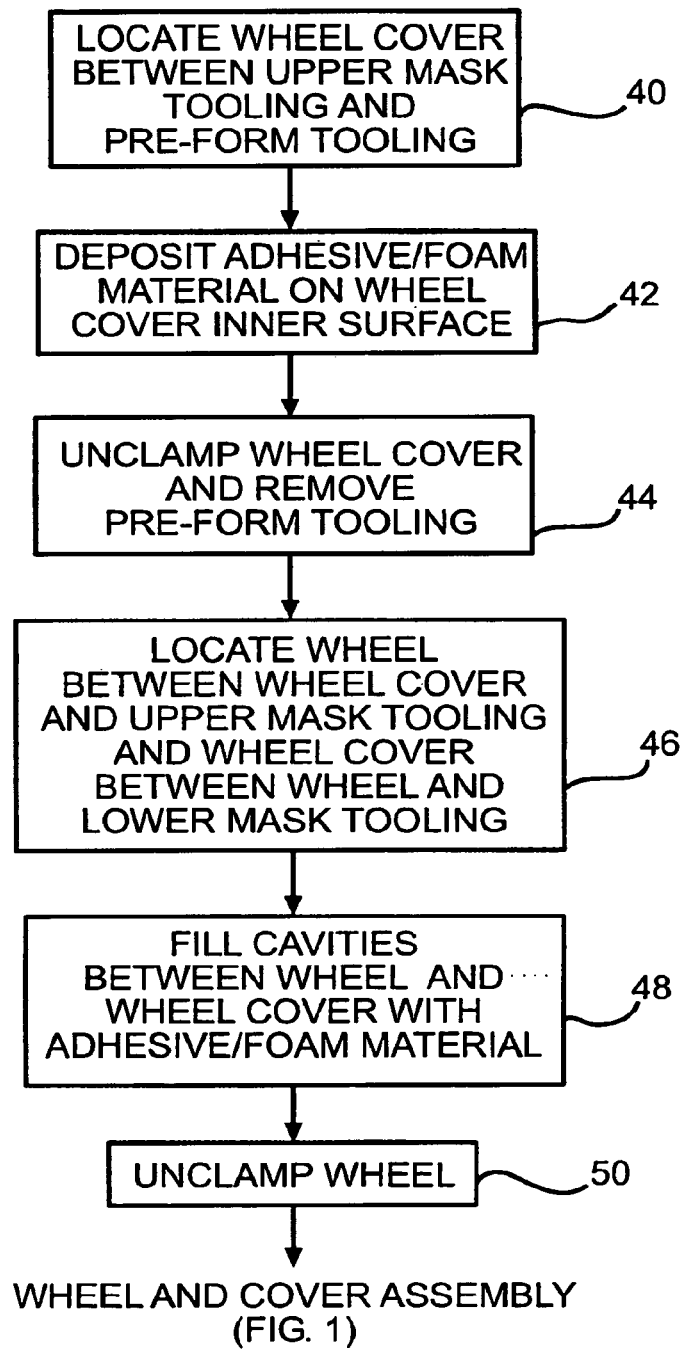
FIG. 4 is another sectional view of the vehicle wheel having the wheel cover shown in FIG. 2 assembled thereon, in accordance with the present invention.
Figure 5:
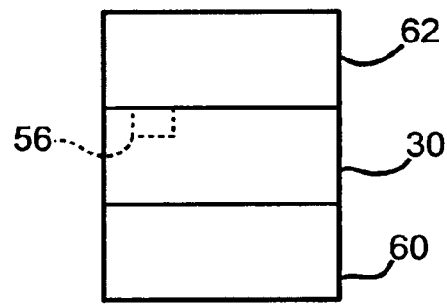
FIG. 5 is a schematic diagram illustrated an example of a first step of a process for producing a vehicle wheel cover retention system in accordance with the present invention.
Figure 6:
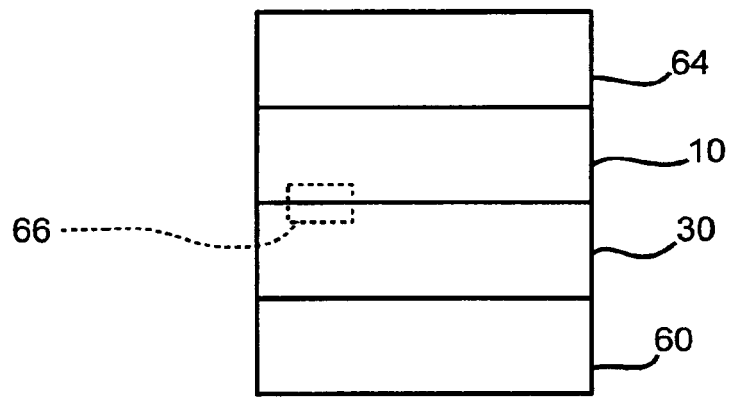
FIG. 6 is a schematic diagram illustrating an example of a second step of a process for producing a vehicle wheel cover retention system in accordance with the present invention.
Figure 7:
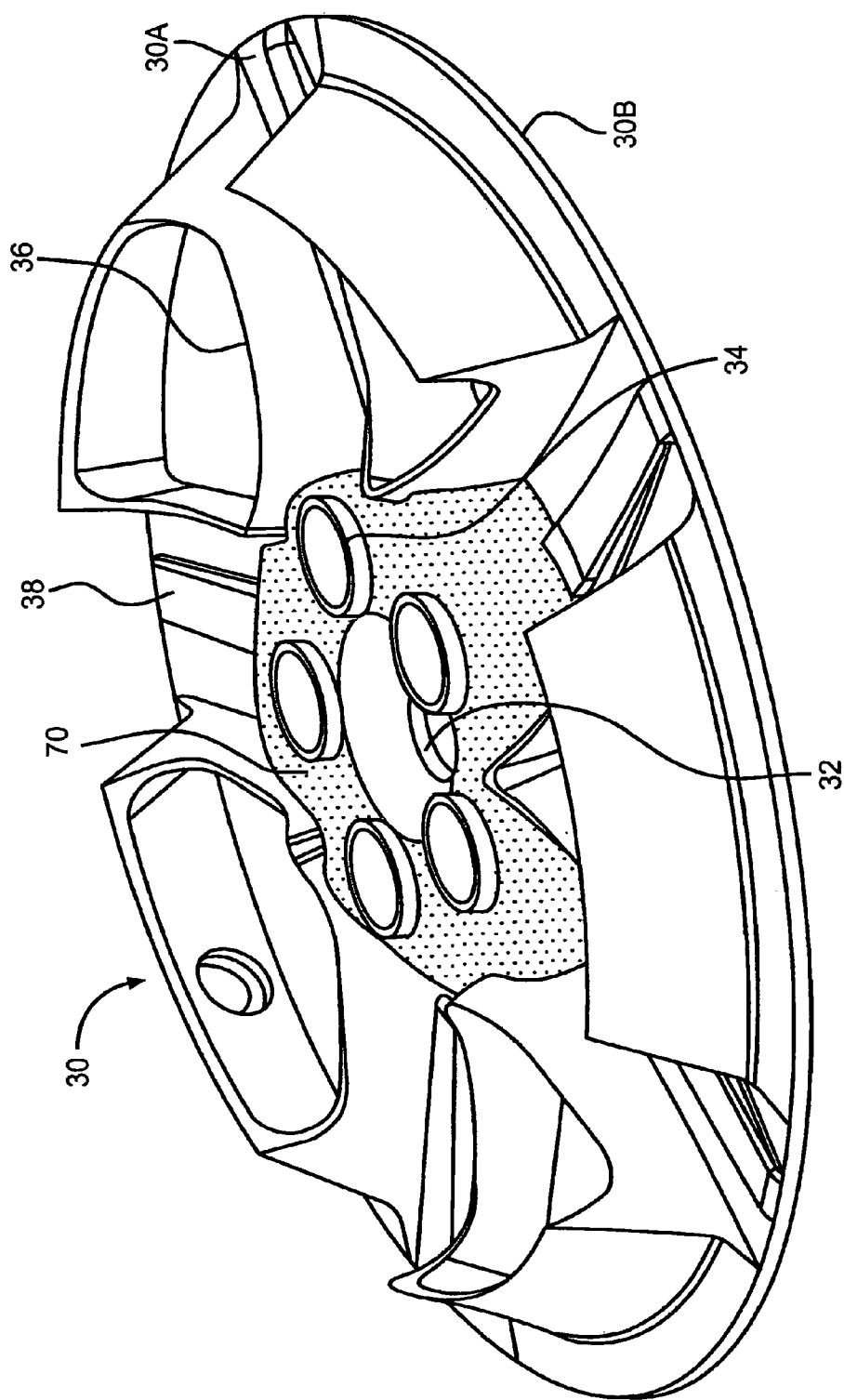
FIG. 7 is a view similar to FIG. 3 showing an alternate embodiment of a first shot of an adhesive/foam material applied to a portion of the wheel cover.

The present invention can be used with any suitable type of vehicle wheel formed of any suitable type of material or materials, such as for example, steel, aluminum and alloys thereof, and can be of any suitable type of wheel construction, such as for example, a "full face" type of wheel, such as shown in FIG. 5A of U.S. Pat. No. 5,533,261 to Kemmerer, a "bead seat attached" wheel such as shown in FIG. 4 of U.S. Pat. No. 5,188,429 to Heck et al., a "well attached" wheel such as shown in FIG. 3 of U.S. Pat. No. 5,188,429 to Heck et al., a "bimetal" wheel construction including an aluminum disc and a steel rim such as shown in U.S. Pat. No. 5,421,642 to Archibald, a "modular wheel" construction such as shown in U.S. Pat. No. 5,360,261 to Archibald et al., a cast aluminum wheel such as shown in U.S. Pat. No. 5,340,418 to Wei, or a euro-flange type of wheel such as shown in U.S. Pat. No. 5,564,792 to Archibald, the disclosures of all of these patents incorporated by reference in entirety herein and a copy of each patent enclosed herewith.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A method for producing a vehicle wheel and wheel cover assembly comprising the steps of:
    (a) providing a wheel cover having an inner surface and an outer surface;
    (b) selectively applying at least one shot of a first adhesive material to a portion of the inner surface of the wheel cover to define a predetermined masked area;
    (c) providing a vehicle wheel having an outboard face;
    (d) positioning the wheel cover and the vehicle wheel relative to one another whereby at least one cavity is formed between the inner surface of the wheel cover, the outboard face of the vehicle wheel, and the masked area of the wheel cover defined by the first adhesive material;
    (e) selectively applying a second adhesive material to the cavity to secure the wheel cover to the vehicle wheel; and
    (f) further including prior to step (b), the step of providing a masking tool and a pre-form tool and the step of clamping the wheel cover between the masking tool and the pre-form tool to define at least one cavity between the pre-form tool and the wheel cover and during step (b) the step of dispensing the first adhesive material through the at least one cavity to the inner surface of the wheel cover to define the masked area.

2. The method of claim 1 wherein the first adhesive material in step (b) is selectively applied about an inner circumferential portion of the inner surface of the wheel cover.

3. The method of claim 2 wherein the first adhesive material in step (b) is selectively applied around a central opening and a plurality of lug bolt openings of the wheel cover.

4. The method of claim 1 wherein the first adhesive material in step (b) is selectively applied around an outer periphery of the inner surface of the wheel cover.

5. The method of claim 1 wherein the second adhesive material in step (e) fills the entire cavity formed between the inner surface of the wheel cover, the outboard face of the vehicle wheel, and the masked area of the wheel cover defined by the first adhesive material.

6. The method of claim 1 further including prior to step (e) the step of providing a first masking tool and a second masking tool and the step of clamping the wheel cover between the vehicle wheel and the first masking tool and vehicle wheel between the second masking tool and the wheel cover to define at least one cavity between the vehicle wheel and the wheel cover and during step (e) the step of dispensing the second adhesive material to the at least one cavity to secure the wheel cover to the vehicle wheel.

7. The method of claim 1 further including prior to step (b) the step providing a first masking tool and a pre-form tool and the step of clamping the wheel cover between the masking tool and the pre-form tool to define at least one first cavity between the pre-form tool and the wheel cover and during step (b) the step of dispensing the first adhesive material through the at least one first cavity to the inner surface of the wheel cover to define the masked area and further including prior to step (e) the step of providing a second masking tool and a third masking tool and the step of clamping the wheel cover between the vehicle wheel and the first masking tool and vehicle wheel between the second masking tool and the wheel cover to define at least one second cavity between the vehicle wheel and the wheel cover and during step (e) the step of dispensing the second adhesive material to the at least one second cavity to secure the wheel cover to the vehicle wheel.

8. The method of claim 1 wherein the vehicle wheel is a one piece aluminum vehicle wheel and the wheel cover is a one piece plastic wheel cover.

9. The method of claim 1 wherein the second adhesive material permanently secures the wheel cover to the vehicle wheel.

10. The method of claim 1 wherein the first adhesive material is molded in-situ on the inner surface of the wheel cover.

11. The method of claim 1 wherein the first adhesive material is separately formed from the wheel cover.

12. The method of claim 11 wherein the first adhesive material is secured to the inner surface of the wheel cover.

13. A vehicle wheel and wheel cover assembly produced according to the method of claim 1.

14. A method for producing a vehicle wheel and wheel cover assembly comprising the steps of:
(a) providing a wheel cover having an inner surface and an outer surface;
(b) selectively applying at least one shot of a first adhesive material to a portion of the inner surface of the wheel cover to define a predetermined masked area;
(c) providing a vehicle wheel having an outboard face;
(d) positioning the wheel cover and the vehicle wheel relative to one another whereby at least one cavity is formed between the inner surface of the wheel cover, the outboard face of the vehicle wheel, and the masked area of the wheel cover defined by the first adhesive material;
(e) selectively applying a second adhesive material to the cavity to secure the wheel cover to the vehicle wheel; and
(f) further including prior to step (e), the step of providing a first masking tool and a second masking tool and the step of clamping the wheel cover between the vehicle wheel and the first masking tool and vehicle wheel between the second masking tool and the wheel cover to define at least one cavity between the vehicle wheel and the wheel cover and during step (e) the step of dispensing the second adhesive material to the at least one cavity to secure the wheel cover to the vehicle wheel.

15. The method of claim 14 wherein the first adhesive material in step (b) is selectively applied about an inner circumferential portion of the inner surface of the wheel cover.

16. The method of claim 14 wherein the second adhesive material in step (e) fills the entire cavity formed between the inner surface of the wheel cover, the outboard face of the vehicle wheel, and the masked area of the wheel cover defined by the first adhesive material.

17. The method of claim 14 wherein the first adhesive material is one of molded in-situ on the inner surface of the wheel cover and separately formed from the wheel cover.

18. A method for producing a vehicle wheel and wheel cover assembly comprising the steps of:
(a) providing a wheel cover having an inner surface and an outer surface;
(b) selectively applying at least one shot of a first adhesive material to a portion of the inner surface of the wheel cover to define a predetermined masked area;
(c) providing a vehicle wheel having an outboard face;
(d) positioning the wheel cover and the vehicle wheel relative to one another whereby at least one cavity is formed between the inner surface of the wheel cover, the outboard face of the vehicle wheel, and the masked area of the wheel cover defined by the first adhesive material;
(e) selectively applying a second adhesive material to the cavity to secure the wheel cover to the vehicle wheel; and
(f) further including prior to step (b), the step of providing a first masking tool and a pre-form tool and the step of clamping the wheel cover between the masking tool and the pre-form tool to define at least one first cavity between the pre-form tool and the wheel cover and during step (b) the step of dispensing the first adhesive material through the at least one first cavity to the inner surface of the wheel cover to define the masked area and further including prior to step (e) the step of providing a second masking tool and a third masking tool and the step of clamping the wheel cover between the vehicle wheel and the first masking tool and vehicle wheel between the second masking tool and the wheel cover to define at least one second cavity between the vehicle wheel and the wheel cover and during step (e) the step of dispensing the second adhesive material to the at least one second cavity to secure the wheel cover to the vehicle wheel.

19. The method of claim 18 wherein the first adhesive material in step (b) is selectively applied about an inner circumferential portion of the inner surface of the wheel cover.

20. The method of claim 18 wherein the second adhesive material in step (e) fills the entire cavity formed between the inner surface of the wheel cover, the outboard face of the vehicle wheel, and the masked area of the wheel cover defined by the first adhesive material.

* * * * *